2 Sheets—Sheet 2.
L. MYERS.
Freight-Car.
No. 225,197. Patented Mar. 2, 1880.
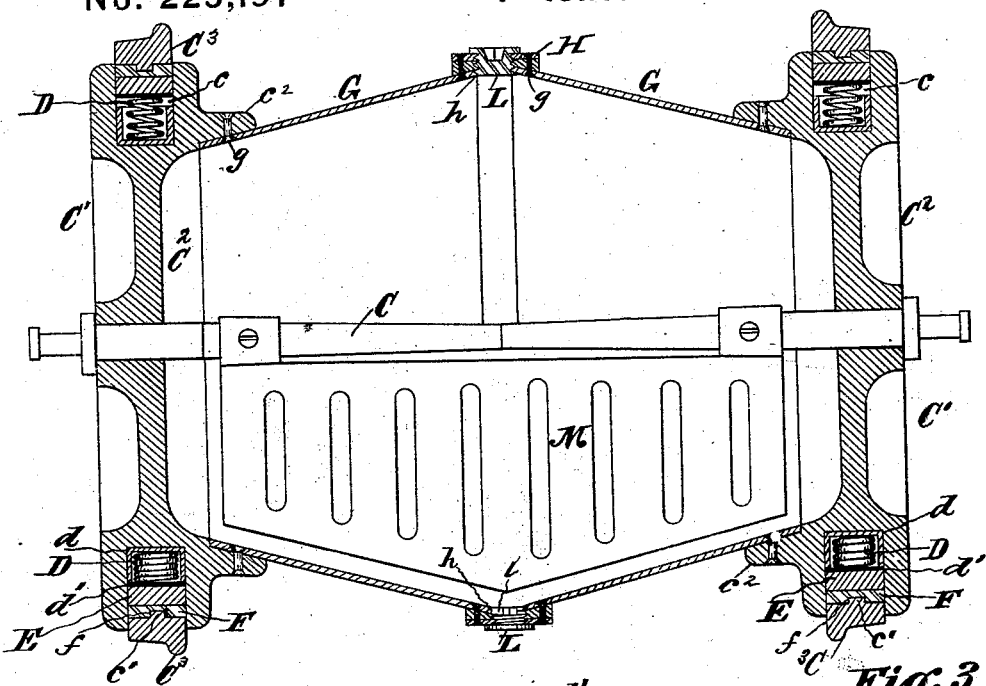
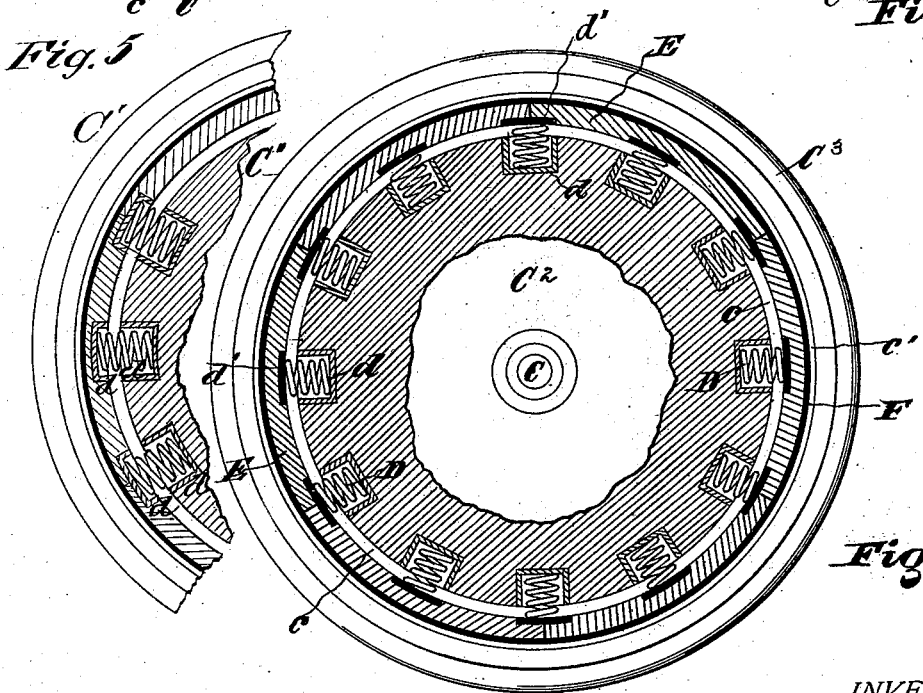
WITNESSES:
Saml. J. VanStavoren
V. Connolly
INVENTOR,
Laurence Myers,
By Connolly Bro
ATTORNEYS

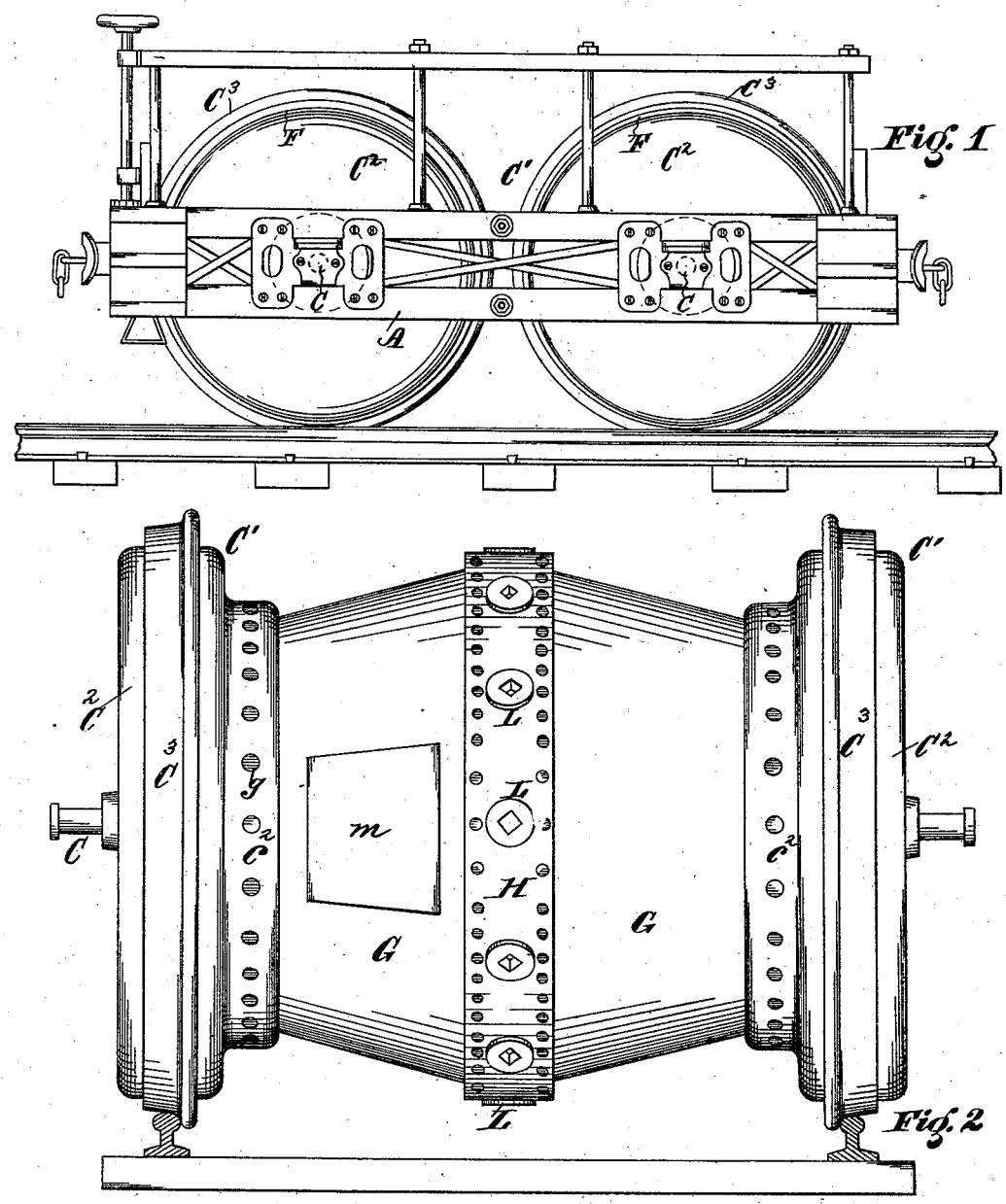

UNITED STATES PATENT OFFICE.

LAURENCE MYERS, OF PHILADELPHIA, PENNSYLVANIA.

FREIGHT-CAR.

SPECIFICATION forming part of Letters Patent No. 225,197, dated March 2, 1880.

Application filed January 2, 1880.

*To all whom it may concern:*

Be it known that I, LAURENCE MYERS, of Philadelphia, in the county of Philadelphia and State of Pennsylvania, have invented certain new and useful Improvements in Freight-Cars; and I do hereby declare the following to be a full, clear, and exact description of the invention, such as will enable others skilled in the art to which it pertains to make and use it, reference being had to the accompanying drawings, which form part of this specification, in which—

Figure 1 is a side elevation of a car embodying my improvements. Fig. 2 is a longitudinal elevation of a section of the same, consisting of two wheels and the inclosing or connecting cylinder. Fig. 3 is a longitudinal vertical section of the same. Fig. 4 is a vertical longitudinal section through one of the wheels, showing modification; and Fig. 5 is a detail sectional view, showing metallic cups in the fellies.

My invention has relation to that class of cars in which the chamber or compartment for the reception of freight consists of a cylinder or approximately - shaped body uniting the wheels, the body thus rolling with the wheels, as distinguished from the ordinary class of cars, in which the body is mounted on trucks, the latter being supported on wheels.

My invention has for its object to improve this class of cars so as to be rendered better adapted than heretofore for the transportation of grain and other solid matter; also to provide means whereby the body of the car may have an elastic support in or on the wheels to which it is attached, thereby taking up shock and reducing wear and tear upon the rolling-stock and track.

My invention has for its further object to facilitate the loading and unloading of such car.

My improvements consist, first, in the peculiar construction of the wheels, whereby an elastic support is afforded to the body or cylinder composing the body of the car; second, in the construction of said body; third, in the details and combinations hereinafter specified.

Referring to the accompanying drawings, A indicates a rectangular frame or truck, in or on which are duly supported two axles, C C, journaled in suitable boxes. On these axles are the wheels $C'$ $C'$, and uniting the latter are cylinders or approximately-shaped chambers forming the bodies of the car.

Each of the wheels consists of a cast-iron central portion, $C^2$, with a wrought-iron rim or tire, $C^3$.

The periphery of the cast-iron part is enlarged and formed with an annular groove, $c$. At suitable intervals in this groove are sockets or recesses for the reception of bearing-springs D, of any suitable material, such as steel or rubber.

Surrounding the springs are fellies or sectional pieces of wood E E, kept in position by an encircling metallic band, F, having an annular groove, $f$, on its periphery, in which fits an annular rib, $c'$, on the tire $C^3$.

Within the sockets in the cast-iron part, and attached to them and the fellies, respectively, are metallic cups $d$, which receive and bear against the ends of the springs and prevent the latter from fracturing or laminating the fellies.

The cups attached to the fellies are, as shown, at the junctions or joints of said fellies.

The wrought-iron tire is applied while heated, and cooled by minute jets of water, so as to be shrunk uniformly throughout its circumference, the rib $c'$ entering the groove $f$ when the shrinking takes place.

The wooden fellies serve to protect the springs against injurious action from heat while the tire is being shrunk on, and also impart additional elasticity to the wheel when in use.

The body, which I have described as cylindrical, is preferably formed of two frusta of cones, G G, united at their bases by a cylindrical band, H, their opposite ends being secured to annular lugs $c^2$ $c^2$ on the cast-iron parts of the wheel $C'$. The body is designed to be formed of boiler-iron, and its parts secured by rivets $g$ $g$ countersunk on the inside. The openings for loading and unloading are formed in the band H, and are shown at $h$. They may be closed in any suitable manner, but preferably by means of screw-stopples L, with spring-catches $l$. There should be a sufficient number of these openings so that, no matter what the position of the body, one of them will be at top and one at bottom, so as to permit loading and discharging at any point in which a car may be stationed, without requiring to be moved specially into position, as would be necessary if but a single opening for the purpose were provided.

The conoidal form of the car-body, sloping from the wheels downward or flaring toward the medial band H, will facilitate the discharge of freight from such body, grain, for example, freely flowing, in the act of discharge, toward the outlet $h$, opened for the purpose, such outlet, of course, being the then lowest one.

To permit access to the interior of the car, a man-hole, $m$, may be formed in one of each pair of wheels.

I have described the wheel as designed for bulk-freight cars the bodies of which are rolling cylinders; but the principle of my improvements in wheels is equally applicable to freight-cars having bodies supported above the wheels, and also to wheels of passenger-cars, as it is manifest that in every such case resiliency will be obtained and the shocks usually felt on such wheels in passing over frogs, &c., taken up. In such cases I would design making the tire of steel rather than of wrought-iron.

I design employing two or more diaphragms, M, in each cylinder or body, so that when the car is started the load will roll with it. Such diaphragms will be attached to the head of the cylinders, and a space will be left between their edges and the walls of said cylinders, so as to have the various compartments which the diaphragms make in communication.

Under some circumstances I may dispense with the wooden fellies and the encircling retaining-band, or use either without the other between the springs and the tire. So, too, plates $d'$, as shown in Fig. 5, may be sometimes used instead of cups in the fellies.

What I claim as my invention is—

1. A pair of car-wheels having each a solid center and an encircling rim or tire, with springs or an elastic medium interposed between said center and tire, in combination with a cylindrical or equivalent body uniting the same, said wheels being formed with inside annular flanges, $c^2$, to which said body is bolted, substantially as shown and described.

2. The wheel $C'$, having cast-iron center $C^2$, with grooved periphery $c$, springs D D, fellies E E, band F, and wrought-iron or steel tire $C^3$, substantially as shown and described.

3. The body G, having greater diameter in its middle than at its ends, in combination with supporting-wheels, which form the heads or ends of said body, substantially as shown and described.

4. The combination, with wheels $C'$ $C'$, of conical sections G and uniting-band H, substantially as herein described.

5. A cylindrical or rolling car-body having multiple loading and discharge openings, said openings being at equal distances apart, or substantially so, and being distributed around the entire circumference of the body, substantially as and for the purpose set forth.

In testimony that I claim the foregoing I have hereunto set my hand this 24th day of December, 1879.

LAURENCE MYERS.

Witnesses:
SAML. J. VAN STAVOREN,
CHAS. F. VAN HORN.